US011718417B2

(12) United States Patent
Datas et al.

(10) Patent No.: US 11,718,417 B2
(45) Date of Patent: Aug. 8, 2023

(54) DEVICE FOR GRIPPING A PANEL OF A FUSELAGE SECTION OF AN AIRCRAFT

(71) Applicants: Airbus (S.A.S.), Blagnac (FR); Airbus Operations (S.A.S.), Toulouse (FR)

(72) Inventors: Jean-Marc Datas, Toulouse (FR); Jacques Bouriquet, Toulouse (FR); Jean-Mickael Brindeau, Blagnac (FR); André Aquila, Cornebarrieu (FR); Patrick Guibert, Blagnac (FR); Nicolas Darbonville, Blagnac (FR); Thomas Autret, Blagnac (FR)

(73) Assignees: Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 431 days.

(21) Appl. No.: 17/003,515

(22) Filed: Aug. 26, 2020

(65) Prior Publication Data
US 2021/0061489 A1  Mar. 4, 2021

(30) Foreign Application Priority Data
Aug. 30, 2019 (FR) ...................................... 1909578

(51) Int. Cl.
*B64F 5/10* (2017.01)
*B25J 9/02* (2006.01)
(Continued)

(52) U.S. Cl.
CPC ................... *B64F 5/10* (2017.01); *B25J 9/02* (2013.01); *B25J 9/10* (2013.01); *B25J 15/0052* (2013.01); *B25J 15/0616* (2013.01)

(58) Field of Classification Search
CPC ........ B64F 5/10; B25J 9/02; B25J 9/10; B25J 15/0052; B25J 15/0616; B25B 5/145;
(Continued)

(56) References Cited

U.S. PATENT DOCUMENTS

| 4,527,783 A | 7/1985 | Collora et al. |
| 2009/0282668 A1 | 11/2009 | Sanchez-Brunete Alvarez |

FOREIGN PATENT DOCUMENTS

| DE | 102 30 270 A1 | 6/2003 |
| EP | 1 514 638 A2 | 3/2005 |

(Continued)

OTHER PUBLICATIONS

French Search Report for Application No. 1909578 dated May 18, 2020.

*Primary Examiner* — Stephen A Vu
(74) *Attorney, Agent, or Firm* — KDW Firm PLLC

(57) ABSTRACT

A gripping device for a panel of a section of a fuselage of an aircraft, the panel including a skin and having an arcuate shape about a longitudinal axis X. The gripping device includes two gripping subsystems arranged at a distance from one another parallel to the longitudinal axis X, and each gripping subsystem includes a central element fastened to the panel, and two lateral elements fastened on either side of the central element by fasteners, and each lateral element includes pressurizers which come against the skin to apply a tension thereto in the opening direction of the arcuate shape. Such a gripping device makes it possible to ensure the shape of the panel when it is transported and until it is fastened to other panels in order to produce the section of the fuselage.

10 Claims, 3 Drawing Sheets

(51) Int. Cl.
*B25J 9/10* (2006.01)
*B25J 15/00* (2006.01)
*B25J 15/06* (2006.01)

(58) Field of Classification Search
CPC ......... B25B 5/147; B25B 11/00; B64C 1/069; B64C 1/12
See application file for complete search history.

(56) References Cited

FOREIGN PATENT DOCUMENTS

EP          1514638 A2 *  3/2005  ............. B23Q 1/035
EP       3 395 692 A1    10/2018

* cited by examiner

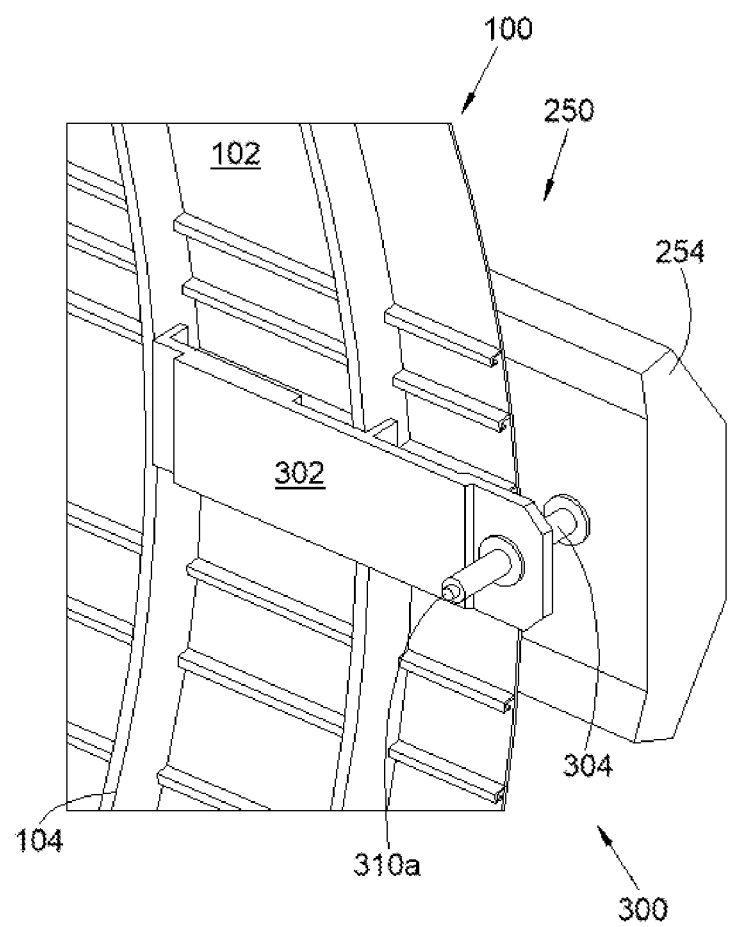

DEVICE FOR GRIPPING A PANEL OF A FUSELAGE SECTION OF AN AIRCRAFT

CROSS-REFERENCE TO RELATED APPLICATION

This application claims the benefit of and priority to French patent application 19 09578 filed on Aug. 30, 2019, the entire disclosure of which is incorporated by reference herein.

TECHNICAL FIELD

The disclosure herein relates to a device for gripping a panel of a fuselage section of an aircraft.

BACKGROUND

A fuselage of an aircraft is made up of a plurality of sections fastened in the continuation of one another, and each section is itself made up of a plurality of panels fastened to one another.

In a production line for such a fuselage, the panels are transported with the aid of relatively bulky carriages which are not always adapted to the shape of the panel.

It is therefore necessary to find a gripping device which makes it possible to ensure the shape of the panel when it is transported.

SUMMARY

An object of the disclosure herein is to propose a device for gripping a panel of a fuselage section of an aircraft that comprises structure for applying a tension to the skin in order to ensure the shape thereof.

Accordingly, there is proposed a gripping device for a panel of a section of a fuselage of an aircraft, the panel comprising a skin and having an arcuate shape about a longitudinal axis X, the gripping device comprising at least two gripping subsystems arranged at a distance from one another parallel to the longitudinal axis X, wherein each gripping subsystem comprises a central element intended to be fastened to the panel, and two lateral elements fastened on either side of the central element by fasteners, and wherein each lateral element comprises pressurizers which are intended to come against the skin in order to apply a tension thereto in the opening direction of the arcuate shape.

Such a gripping device thus makes it possible to ensure the shape of the panel when it is transported and until it is fastened to other panels in order to produce the section of the fuselage.

Advantageously, the pressurizers comprise legs mounted in a translationally movable manner, and wherein each leg is adjustable in position perpendicularly to the skin and is intended to bear against a face of the skin.

Advantageously, the gripping device comprises an actuator for each leg that adjusts the position of the leg, and a control unit which controls each actuator.

According to one particular embodiment, the central part comprises two main fittings intended to be fastened to the panel on the inner side of the arcuate shape, and a central fitting fastened between the two main fittings, each lateral element is fastened to a main fitting on the opposite side to the central fitting, and the legs are mounted in a translationally movable manner on each lateral element, and wherein each leg is intended to bear against an inner face of the skin.

Advantageously, the central fitting also comprises pressurizers in the form of adjustable legs intended to bear against the inner face of the skin.

Advantageously, each leg comprises a suction cup which is intended to maintain the leg against the skin.

Advantageously, the gripping device comprises a generator which creates the vacuum within each suction cup, and a control unit which controls the vacuum generator.

According to another particular embodiment, the central part is common to the plurality of gripping subsystems and forms a beam which extends parallel to the longitudinal axis X on the outer side of the panel, the gripping device comprises, for each end of the central part, an attachment system which comprises a palette fastened to the panel on the inner side of the arcuate shape, and a spacer fastened between the palette and the central part, the fasteners form a pivot connection about an axis of rotation parallel to the longitudinal axis X, the legs are intended to bear against an outer face of the skin, and the pressurizers comprise attachment devices which attach to the panel and, for each lateral element, an actuator which is mounted in an articulated manner between the lateral element and the central element so as to move the lateral element rotationally about the axis of rotation, and the gripping device also comprises a control unit which controls each actuator.

Advantageously, the attachment devices comprise, for each leg, a suction cup which is secured to the leg and which is applied against the outer face of the panel, and a vacuum generator which creates the vacuum within each suction cup, and the control unit controls the vacuum generator.

Advantageously, reinforcing bars are fastened between the lateral elements which are aligned parallel to the longitudinal axis X.

BRIEF DESCRIPTION OF THE DRAWINGS

The features of the disclosure herein which are mentioned above, and others beside, will become more clearly apparent upon reading the following description of an exemplary embodiment, the description being given with reference to the appended drawings, in which:

FIG. 3 is a perspective view of detail of the fastening of the gripping device of FIG. 2 to the panel.

DETAILED DESCRIPTION

Figure 1:
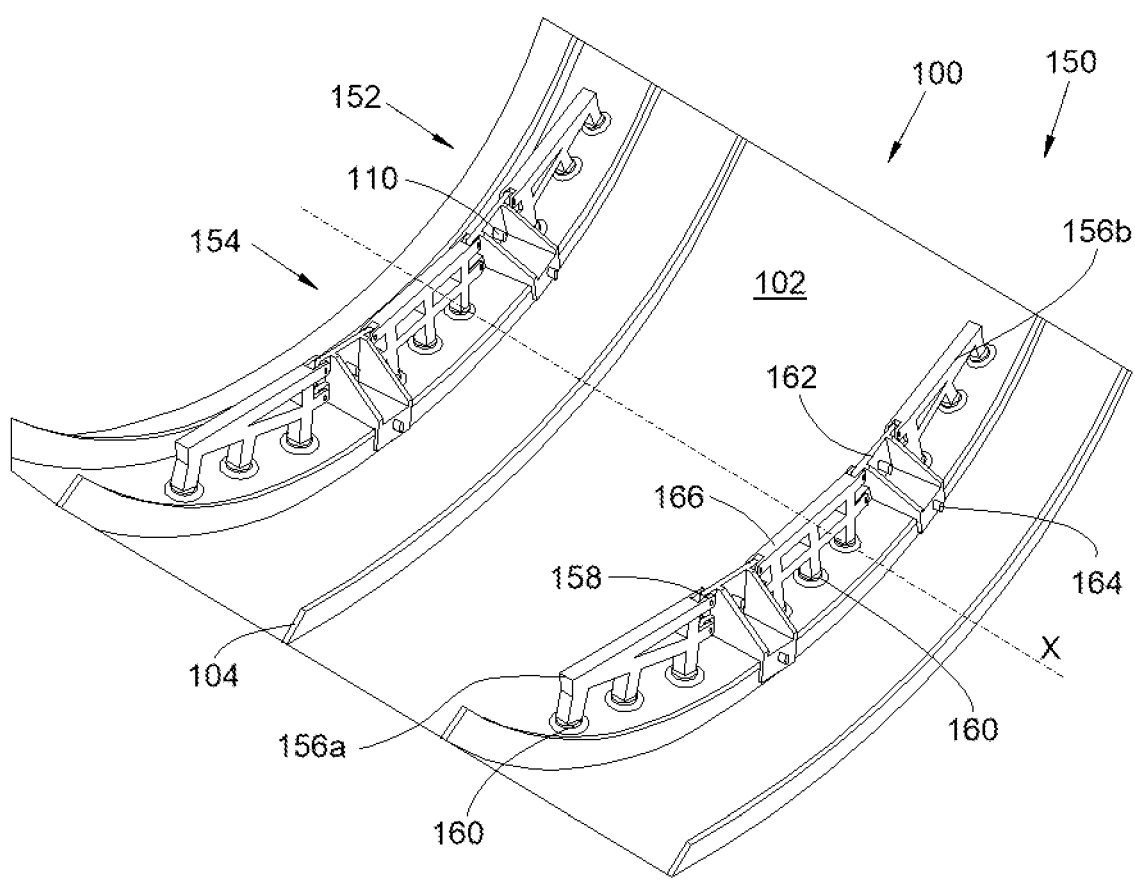
FIG. 1 is a perspective view of a panel of a section of a fuselage of an aircraft that is equipped with a gripping device according to a first embodiment of the disclosure herein.
Figure 2:
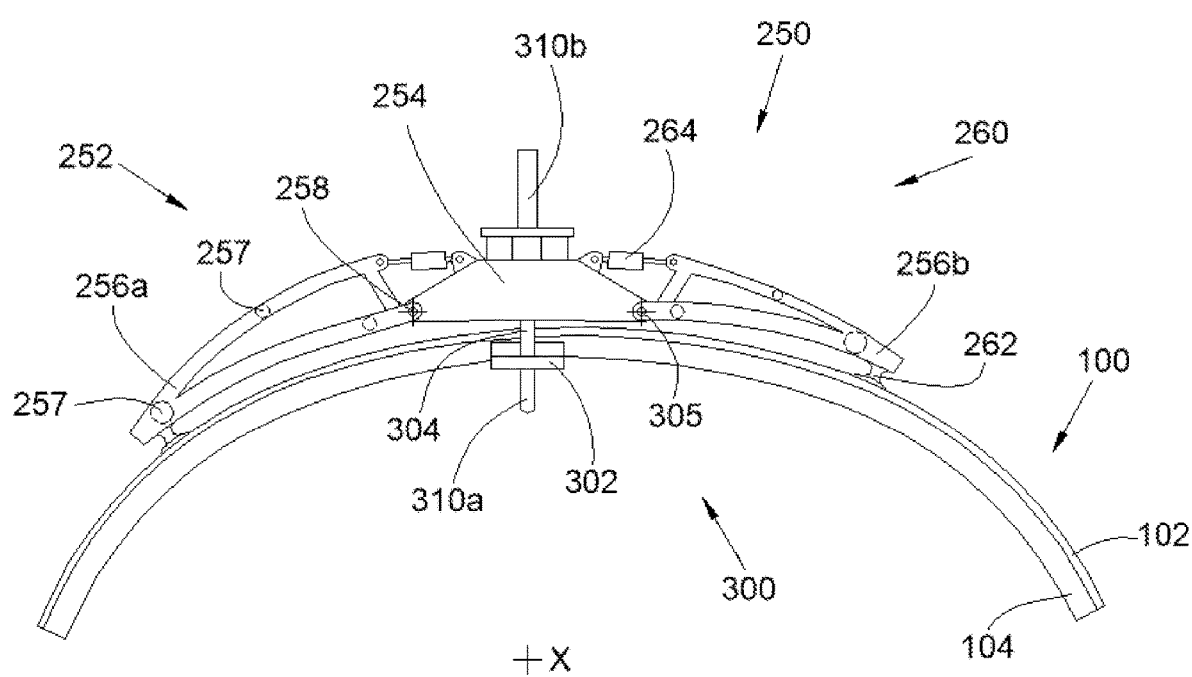
FIG. 2 is a side view of a panel of a section of a fuselage of an aircraft that is equipped with a gripping device according to a second embodiment of the disclosure herein.

FIGS. 1 through 3 show a panel 100 of a section of a fuselage of an aircraft. The panel 100 has an arcuate shape about a longitudinal axis X and it comprises a skin 102 and profiles 104 fastened to the inner face of the skin 102. Each profile 104 thus assumes an arch shape. Here, the profiles 104 are stiffeners and, in this instance, frames in aeronautical jargon.

During the production of the panel 100, the profiles 104 are pierced with reference holes which serve as dimensional references for the panel 100, and the position of each hole is therefore known.

In each of the embodiments of the disclosure herein, the panel 100 is equipped with a gripping device 150, 250 which is fastened to the panel 100 and which places the panel 100 under tension in order to avoid deformations and makes it possible to manipulate the panel 100 easily with the aid of handling tools such as a gantry, a bearing structure, etc.

Each of the gripping devices 150, 250 comprises at least two gripping subsystems 152, 252, wherein each of the gripping subsystems 152, 252 is fastened to the panel 100 and at a distance from one another parallel to the longitudinal axis X.

In FIG. 2, only one of the gripping subsystems 252 is visible given that this is a side view and that the other gripping systems 252 are spaced apart according to the front view.

Each gripping subsystem 152, 252 comprises a central element 154, 254 fastened to the panel 100, and more particularly at the reference holes. The holes in the panel allow the gripping device to be fastened to the panel by screwing devices, pins or equivalent. They also make it possible to provide a reference for the positioning of the gripping device on the panel.

Each gripping subsystem 152, 252 also comprises two lateral elements 156*a-b*, 256*a-b* which are fastened on either side of the central element 154, 254 while extending it. Each lateral element 156*a-b*, 256*a-b* is fastened to the central element 154, 254 by fasteners 158, 258.

In the embodiment of FIG. 1, the gripping device 150 is positioned on the inner side of the arcuate shape of the panel 100, and the lateral elements 156*a-b* are aligned in a plane perpendicular to the longitudinal axis X.

In the embodiment of FIGS. 2 and 3, the gripping device 250 is positioned on the outer side of the arcuate shape of the panel 100, and the lateral elements 256*a-b* are also aligned in a plane perpendicular to the longitudinal axis X.

Each of the lateral elements 156*a-b*, 256*a-b* comprises pressurizers 160; 260 which come against the skin 102 in order to apply a tension thereto in the opening direction of the arcuate shape. That is to say that, in the case of FIG. 1, the pressurizers 160 which are on the inner side of the arcuate shape push it, and; in the case of FIGS. 2 and 3, the pressurizers 260 which are on the outer side of the arcuate shape pull it.

Thus, the gripping device is fastened at its central element to the panel with the aid of fasteners using the reference holes in the panel to ensure the fastening and the positioning of the device; the lateral elements are fastened on either side of the central element to the central element and make it possible, by way of pressurizers, to apply a tension to the panel.

Such a gripping device 150, 250 thus makes it possible to ensure the shape of the panel 100 when it is transported and until it is fastened to other panels in order to produce the section of the fuselage. The gripping device 150, 250 thus ensures the nominal conformity of the panel 100, and the inner or outer contact points reproduce theoretical corresponding profile, and the device ensures the geometric conformity of the panel 100 throughout manufacture.

In the embodiment of FIG. 1, the central part 154 comprises two main fittings 162, wherein each is fastened to the panel 100 on the inner side of the arcuate shape, that is to say on the inner side of the panel 100, by fasteners 164 such as for example screwing elements or calibrated pins at the reference holes. The central part 154 also comprises a central fitting 166 which is fastened between the two main fittings 162, in particular here by two devises of parallel axis that are arranged on each side of the central fitting 166 and thus ensure locking in position.

Each lateral element 156*a-b* is fastened to a main fitting 162 on the opposite side to the central fitting 166, The fasteners 158 are constituted here by two devises of parallel axis, thus ensuring locking in position.

Thus, each gripping subsystem 152 successively comprises, from one end to the other, a lateral element 156*a*, a main fitting 162, a central fitting 166, a main fitting 162, and a lateral element 156*b*.

Each lateral element 156*a-b* and the central fitting 166 here take the form of a network of beams which are arranged in a plane perpendicular to the longitudinal axis X.

The pressurizers 160 here comprise legs mounted in a translationally movable manner on each lateral element 156*a-b*, and wherein each leg bears against a face of the skin 102 and is adjusted in position perpendicularly to the skin 102 and serves as a mechanical stop in order to adjust the geometric position of the skin 102. The positional adjustment of a leg makes it possible to bring the leg to bear against the inner face of the skin 102 in order to exert the tension which ensures the correct position of the panel 100. In the embodiment of the disclosure herein presented here, the pressurizers 160 also comprise, for each leg, a suction cup which is around the leg and which maintains the leg against the skin 102.

In the embodiment of the disclosure herein presented in FIG. 1, the central fitting 166 also comprises pressurizers 160 comprising adjustable legs bearing against the inner face of the skin 102, with, here too, for each leg, a suction cup which is around the leg and which maintains the leg against the skin 102.

To ensure that the suction cup has a contact normal to the skin 102, the suction cup is mounted on the associated leg by a ball-joint connection.

To ensure good attachment of the suction cups to the skin 102, the pressurizers 160 can comprise a vacuum generator which creates the vacuum within each suction cup.

The positional adjustment of each leg is effected with the aid of all appropriate manual systems or preferably actuators (jacks, motors, etc.). The positional adjustment of the leg can also be implemented for example by screwing/unscrewing the leg with respect to the associated lateral element 156*a-b* or the associated central fitting 166.

In the embodiment of FIGS. 2 and 3, the central part 254 is common to the plurality of gripping subsystems 252 and takes the form of a beam which extends parallel to the longitudinal axis X on the outer side of the panel 100.

The central part 254 is fastened at each of its ends by an attachment system 300 of the gripping device 250 that comprises a palette 302 which is arranged on the inner side of the panel 100, that is to say on the inner side of the arcuate shape, and which is fastened to the panel 100 by fasteners such as for example screwing elements at the reference holes.

On each side of the panel 100, the ends of the palette 302 and of the central part 254 extend beyond the panel 100, and each attachment system 300 also comprises a spacer 304 which is fastened between the ends of the palette 302 and of the central part 254 which protrude beyond the panel 100.

Each lateral element 256*a-b* is fastened to the central part 254 by way of the fasteners 258 which form a pivot connection about an axis of rotation 305 parallel to the longitudinal axis X. The fasteners 258 are constituted here by a clevis between the lateral element 256*a-b* and the central element 254.

Each lateral element 256*a-b* here takes the form of a network of beams which are arranged in a plane perpendicular to the longitudinal axis X.

The pressurizers 260 comprise legs which bear against the outer face of the skin 102 and which serve as a mechanical stop in order to adjust the geometric position of the skin 102, and attachment devices 262 which are fastened to each lateral element 256a-b and which attach to the panel 100, and more particularly to the outer face of the skin 102, in order to maintain the skin 102 against the leg. According to one particular embodiment, the attachment devices 262 comprise, for each leg, a suction cup which is fastened around the leg and which is applied against the outer face of the panel 100, that is to say of the skin 102, and a vacuum generator which creates the vacuum within each suction cup to ensure attachment. To complete the position of each leg with respect to the skin 102, and as for the preceding embodiment, each leg can be translationally movable perpendicularly to the skin 102. The adjustment of each leg is effected with the aid of all appropriate manual systems or preferably actuators (jacks, motors, etc.). The positional adjustment of the leg can also be implemented for example by screwing/unscrewing the leg with respect to the associated lateral element 256a-b.

For each lateral element 256a-b, the pressurizers 260 also comprise an actuator 264, here a jack, which is mounted in an articulated manner between the lateral element 256a-b and the central element 254 so as to move the lateral element 256a-b rotationally about the axis of rotation 305. Thus, on the basis of FIG. 2, when the actuator 264 pulls on the lateral element 256a-b, the pressurizers 260 and the attachment devices 262 fastened to the lateral element 256a-b raise the skin 102, and vice versa.

The combination of the attachment devices 262 and the actuators 264 makes it possible to adjust the position of the attachment devices 262 and thus exert the tension which ensures the correct position of the panel 100.

In the embodiment of the disclosure herein presented in FIG. 2, each lateral element 256a-b comprises a single attachment devices 262.

In order to reinforce the stiffness of the lateral elements 256a-b of the gripping subsystems 252, reinforcing bars 257 are fastened between the lateral elements 256a-b which are aligned parallel to the longitudinal axis X. The reinforcing bars 257 are parallel to the longitudinal axis X and are shown as a dotted line in FIG. 2.

The panels 100 thus equipped with a gripping device 150, 250 can then be taken charge of by handling tools. To this end, each gripping device 150, 250 comprises couplers 110, 310a, 310b which allow the handling tool, comprising adapted couplers, to take charge of the gripping device 150, 250 and the panel 100, The couplers 110, 310a, 310b are here arranged on the central part 154, 254 and/or on the spacers 304.

According to one particular embodiment, the couplers 110, 310a are adapted to be used with a ball-lock system (such as for example the system from Jergens® known by the name "Zero Point Mounting System"), in each of the embodiments, in order to control each actuator and the vacuum generator, the gripping device comprises a control unit which conventionally comprises, connected by a communication bus: a processor or CPU ("Central Processing Unit"); a RAM ("Random Access Memory"); a ROM ("Read Only Memory"); a storage unit such as a hard disk or a storage medium reader; at least one communication interface making it possible for example for the control unit to communicate with the motors, actuators, etc. Such a control unit can thus communicate with the actuators for adjusting the legs, the actuators 264 of the second embodiment, and the vacuum generator.

When a panel 100 and a gripping device 150, 250 are combined, the geometric data relating to this panel 100 and to this gripping device 150, 250 are transmitted to the control unit, which positions each actuator according to the geometric data.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A panel of a section of a fuselage of an aircraft, the panel comprising:
    reference holes;
    a gripping device; and
    a skin;
    wherein the panel has an arcuate shape about a longitudinal axis (X);
    wherein the gripping device comprises:
        couplers configured to allow a handling tool to manipulate the panel; and
        at least two gripping subsystems arranged at a distance from one another, parallel to the longitudinal axis (X), each gripping subsystem of the at least two gripping subsystems comprising:
        a central element fastened to the panel by fasteners at the reference holes of the panel; and
        two lateral elements that are fixed on opposite sides of the central element from each other, wherein each lateral element of the two lateral elements comprises pressurizers configured, when against the skin, to apply a tension to the skin in an opening direction of the arcuate shape.

2. The panel according to claim 1, wherein:
    each of the pressurizers comprise a leg mounted in a translationally movable manner; and
    the leg of each pressurizer is adjustable in position perpendicularly to the skin to bear against a face of the skin.

3. The panel according to claim 1, wherein the gripping device comprises:
    a plurality of actuators, each of the legs comprising an actuator of the plurality of actuators configured to adjust the position of the leg; and
    a controller configured to control each of the plurality of actuators.

4. The panel according to claim 1, wherein:
    the central element comprises:
        two main fittings configured for fastening to the panel on an inner side of the arcuate shape; and
        a central fitting fastened between the two main fittings; and
    each lateral element is fastened to one of a plurality of main fittings, each main fitting of the plurality of main fittings being arranged on an opposite side of the central fitting from each other;

the legs of the pressurizers are mounted in a translationally movable manner on each lateral element; and
each leg can bear against an inner face of the skin.

5. The panel according to claim 4, wherein the central fitting comprises pressurizers in a form of adjustable legs configured to bear against the inner face of the skin.

6. The panel according to claim 4, wherein each leg of the pressurizers comprises a suction cup configured to maintain the leg against the skin.

7. The panel according to claim 6, wherein the gripping device comprises:
a vacuum generator configured to create a vacuum within each of the suction cups; and
a controller configured to control the generator.

8. A panel of a section of a fuselage of an aircraft, the panel comprising:
reference holes;
a gripping device; and
a skin;
wherein the panel has an arcuate shape about a longitudinal axis (X);
wherein the gripping device comprises:
couplers configured to allow a handling tool to manipulate the panel;
a central part in a form of a beam, which extends parallel to the longitudinal axis (X) on an outer side of the panel;
at least two gripping subsystems arranged at a distance from one another, parallel to the longitudinal axis (X), each gripping subsystem of the at least two gripping subsystems comprising two lateral elements that are fixed on opposite sides of the central element from each other;
for each end of the central part, an attachment system comprising:
a palette fastened to the panel on an inner side of the arcuate shape; and
a spacer fastened between the palette and the central part;
a plurality of actuators, each actuator being mounted in an articulated manner between one of the two lateral elements and the central element to move the lateral element rotationally about the axis of rotation; and
a controller configured to control each of the plurality of actuators;
wherein the fasteners form a pivot connection about an axis of rotation parallel to the longitudinal axis (X),
wherein each lateral element of the two lateral elements comprises pressurizers configured, when against the skin, to apply a tension to the skin in an opening direction of the arcuate shape, the pressurizers comprising attachment devices configured to attach to the panel;
wherein the pressurizers comprise legs mounted in a translationally movable manner, each leg being adjustable in position perpendicularly to the skin to bear against a face of the skin
wherein the legs are configured to bear against an outer face of the skin.

9. The panel according to claim 8, wherein:
the attachment devices comprise, for each leg, a suction cup secured to the leg, each of the suction cups being configured for being applied against the outer face of the panel;
the gripping device comprises a vacuum generator configured to create a vacuum within each of the suction cups; and
the controller is configured to control the vacuum generator.

10. The panel according to claim 8, comprising reinforcing bars that are fastened between the lateral elements and are aligned parallel to the longitudinal axis (X).

* * * * *